U S 0 0 8 2 7 2 4 7 0 B 2

US008272470B2

(12) United States Patent
Karlsson

(10) Patent No.: US 8,272,470 B2
(45) Date of Patent: Sep. 25, 2012

(54) STEERING LINKAGE

(75) Inventor: Peter Karlsson, Södertälje (SE)

(73) Assignee: Scania CV AB (SE)

( * ) Notice: Subject to any disclaimer, the term of this patent is extended or adjusted under 35 U.S.C. 154(b) by 43 days.

(21) Appl. No.: 12/919,093

(22) PCT Filed: Feb. 16, 2009

(86) PCT No.: PCT/SE2009/050159
§ 371 (c)(1),
(2), (4) Date: Aug. 24, 2010

(87) PCT Pub. No.: WO2009/108112
PCT Pub. Date: Sep. 3, 2009

(65) Prior Publication Data
US 2011/0000735 A1    Jan. 6, 2011

(30) Foreign Application Priority Data
Feb. 29, 2008 (SE) ........................ 0800485

(51) Int. Cl.
*B62D 5/12* (2006.01)
*B62D 7/14* (2006.01)
*B62D 7/16* (2006.01)

(52) U.S. Cl. ............... 180/408; 280/91.1; 280/93.502; 180/409; 180/414; 180/440

(58) Field of Classification Search ............... 180/408, 180/409, 414, 417, 418, 419, 432, 438, 439, 180/440; 280/91.1, 93.502, 93.509, 93.51
See application file for complete search history.

(56) References Cited

U.S. PATENT DOCUMENTS

| 1,891,578 | A | * | 12/1932 | Reed | 180/409 |
| 2,354,830 | A | * | 8/1944 | Reid | 180/409 |
| 3,292,725 | A | * | 12/1966 | Hlinsky | 180/414 |
| 5,890,558 | A | * | 4/1999 | Keegan | 180/211 |
| 2006/0185926 | A1 | * | 8/2006 | Simard et al. | 180/409 |

FOREIGN PATENT DOCUMENTS

| EP | 0955226 | A2 |   | 11/1999 |
| JP | 55145065 | A | * | 11/1980 |
| JP | 55148652 | A | * | 11/1980 |
| JP | 60157475 | U | * | 10/1985 |
| JP | 60184767 | U | * | 12/1985 |
| JP | 63028768 | A |   | 2/1988 |

(Continued)

OTHER PUBLICATIONS

Machine Translation JP 55145065 A.*

(Continued)

*Primary Examiner* — Joseph Rocca
(74) *Attorney, Agent, or Firm* — Ostrolenk Faber LLP

(57) ABSTRACT

A steering linkage for a vehicle, having a first draglink (32), an auxiliary steering cylinder (34) and a second draglink (38). The auxiliary steering cylinder (34) has a through piston rod (36). The first draglink (32) is arranged between a guide arm (12) of a steering gear (10) and a first end (35) of the through piston rod (36). The second draglink (38) is arranged between steerable vehicle wheels (48, 50) and the second end (37) of the through piston rod (36), thereby making it possible for the steerable vehicle wheels (48, 50) to be steered via the steering gear (10).

6 Claims, 3 Drawing Sheets

FOREIGN PATENT DOCUMENTS

JP 63-59074 * 4/1988

OTHER PUBLICATIONS

Machine Translation JP63-59074.*
Machine Translation JP 55148652 A.*
Machine Translation JP 63028768.*

"Toward" Definition, Merriam-Webster Online-Dictionary, available at http://www.merriam-webster.com/dictionary/toward (last visited Apr. 16, 2012).*
"To" Definition, Merriam-Webster Online-Dictionary, available at http://www.merriam-webster.com/dictionary/to (last visited Apr. 16, 2012).*
International Search Report dated Jun. 11, 2009, issued in corresponding international application No. PCT/SE2009/050159.

* cited by examiner

US 8,272,470 B2

STEERING LINKAGE

CROSS REFERENCE TO RELATED APPLICATION

The present application is a 35 U.S.C. §§371 national phase conversion of PCT/SE2009/050159 filed Feb. 16, 2009, which claims priority of Swedish Application No. 0800485-5, filed Feb. 29, 2008, the disclosure of which is incorporated by reference herein. The International Application was published in the English Language.

TECHNICAL FIELD

The present invention relates to a steering linkage for a vehicle and to connection from a steering gear to steerable wheels.

BACKGROUND

A number of heavy vehicles are provided with more than one axle with steerable wheels, e.g. double front axles with steerable wheels on both axles. Counting from the front of the vehicle, the wheels on the second steerable axle are usually steered via a linkage connected to the steering gear's drop arm. The linkage comprises draglinks and an intermediate drop arm which is supported in a bracket on the frame of the vehicle. An auxiliary steering cylinder is connected to the intermediate drop arm to provide sufficient force for steering of the wheels on the second steerable axle, since the steering gear has only enough force to steer the wheels on the first steerable axle.

A problem of vehicles with two steerable front axles with steerable wheels arranged on both front axles as above is that a linkage with associated intermediate drop arm occupies much space while at the same time the intermediate drop arm requires maintenance in the form of lubrication of an associated frame bearing.

BRIEF DESCRIPTION OF THE INVENTION

The problem that a linkage with an associated intermediate drop arm occupies much space while at the same time the intermediate drop arm requires maintenance in the form of lubrication of an associated frame bearing is solved according to the invention by a steering linkage according to the invention. The invention relates to a steering linkage for a vehicle, in which the steering linkage comprises a first draglink, an auxiliary steering cylinder and a second draglink. The auxiliary steering cylinder comprises a through piston rod. The first draglink is arranged between a guide arm of a steering gear and a first end of the through piston rod. The second draglink is arranged between steerable vehicle wheels and the second end of the through piston rod, thereby making it possible for the steerable vehicle wheels to be steered via the steering gear.

A steering linkage according to the invention which has the characteristics that an auxiliary steering cylinder comprises a through piston rod and that draglinks are arranged between the ends of the through piston rod and a steering gear and steerable vehicle wheels respectively affords the advantage that the intermediate drop arm can be dispensed with, leading to a reduction in the number of ball joints while at the same time the need to lubricate the frame bearing of the previously known intermediate drop arm is eliminated and less space is required for the linkage.

BRIEF DESCRIPTION OF THE DRAWINGS

The invention is explained in more detail below with reference to the attached drawings, in which.

DESCRIPTION OF PRIOR ART EMBODIMENT AND OF PREFERRED EMBODIMENTS

Similar items in the various drawings are designated by the same reference notations.

Figure 1:
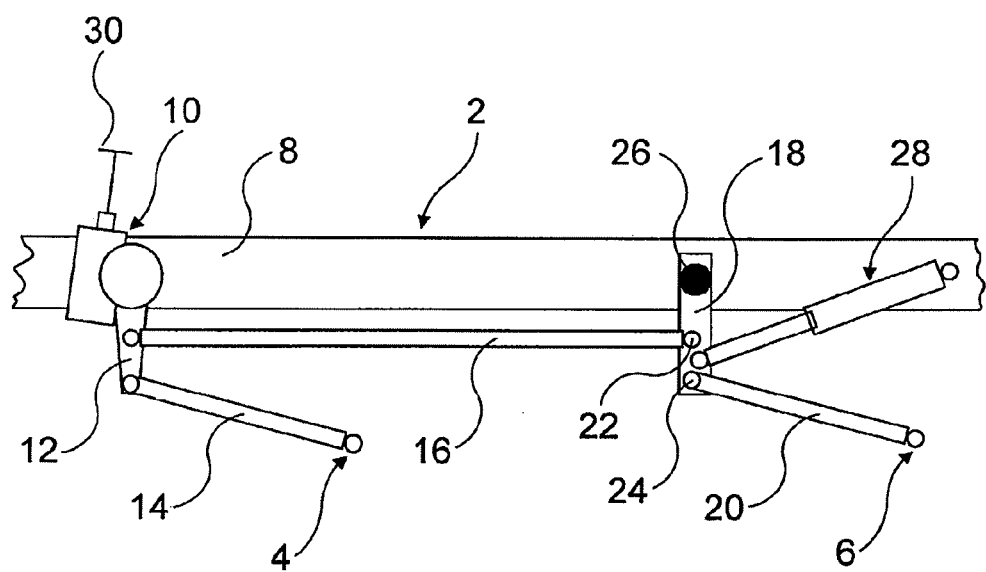
FIG. 1 depicts schematically a vehicle with two steerable front axles according to the state of the art.

FIG. 1 depicts schematically a vehicle 2 with two steerable front axles 4, 6 according to the state of the art. The vehicle 2 comprises a vehicle frame 8, a steering gear 10, e.g. a servo steering gear, mounted on the vehicle frame 8, a guide arm 12 connected pivotably to the steering gear 10, and a draglink 14 arranged for articulation relative to the guide arm 12 and adapted to steering the steerable wheels (not depicted) arranged on the steerable first front axle 4 of the vehicle via a draglink arm and track rod (not depicted). A second draglink 16 is arranged for articulation relative to the guide arm 12 for steering of the steerable wheels (not depicted) arranged on the second steerable front axle 6 of the vehicle 2. This second draglink 16 is connected via an intermediate drop arm 18 and a third draglink 20 which is adapted to steering the steerable wheels (not depicted) on the second steerable front axle 6 of the vehicle via a draglink arm and track rod (not depicted). The draglinks 16, 20 are arranged for articulation relative to the intermediate drop arm 18 via ball joints, 22, 24. The intermediate drop arm 18 is further supported in a bracket 26 at the frame 8 of the vehicle 2, where the bearing between the intermediate drop arm 18 and the bracket 26 needs lubrication. An auxiliary steering cylinder 28 is also connected in a known manner articulatedly to the intermediate drop arm 18 in order to provide sufficient force for steering of the wheels on the second steerable front axle 6, since the steering gear 10 has only enough force to steer the wheels on the first steerable front axle 4. The steering gear 10 is arranged in such a way that when the steering wheel 30 of the vehicle 2 is turned in one direction, e.g. to the left, the guide arm 12 moves forward, and when the steering wheel 30 is turned in the other direction the guide arm 12 moves rearward. The guide arm 12, the draglinks 14, 16, 20 and the intermediate drop arm 18 are rigid. The front axles 4, 6 of the vehicle 2 are resiliently suspended in the frame 8 of the vehicle 2 by, for example, a leaf spring package (not depicted) or air springing (not depicted).

Figure 2:
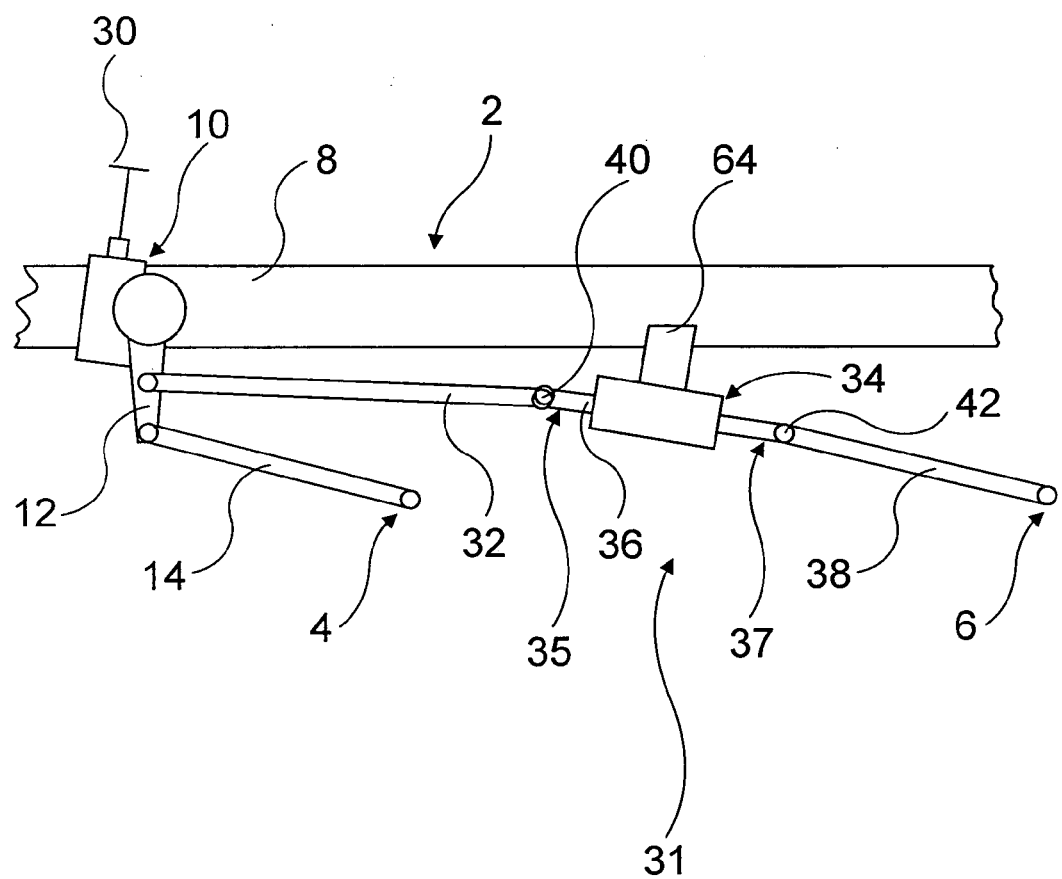
FIG. 2 depicts schematically a vehicle with steerable wheels on two front axles according to a first embodiment of the invention.
Figure 3:
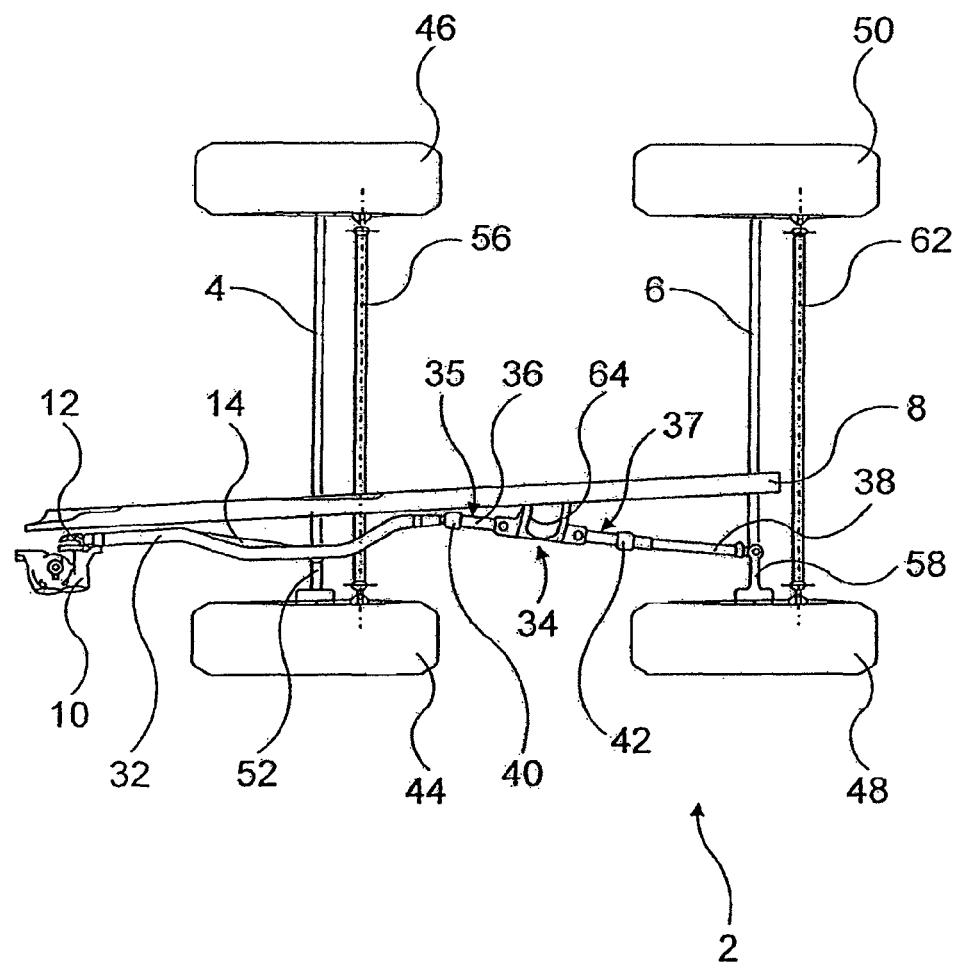
FIG. 3 depicts schematically a vehicle with steerable wheels on two front axles according to the invention.

FIG. 2 depicts schematically a vehicle 2 with two steerable front axles 4, 6 according to a first embodiment of the invention. The vehicle 2 comprises a vehicle frame 8, a steering gear 10 mounted on the vehicle frame 8, a guide arm 12 connected pivotably to the steering gear 10, and a main draglink 14 arranged for articulation relative to the guide arm 12 and adapted to steering the steerable wheels (not depicted) arranged on the steerable first front axle 4 of the vehicle via a draglink arm and track rod (not depicted). Examples of these elements not depicted in FIG. 2 are seen in FIG. 3. A first draglink 32 is also arranged for articulation relative to the guide arm 12 for steering of the steerable wheels (not depicted, but see FIG. 3) arranged on the second steerable front axle 6 of the vehicle 2. This first draglink 32 is connected via an auxiliary steering cylinder 34 with through piston rod 36 to a second draglink 38 which is adapted to steering the steerable wheels (not depicted) on the second steerable front axle 6 of the vehicle via a draglink arm and track rod (not depicted, but see FIG. 3) by the first draglink 32 being connected to a first end 35 of the through piston rod 36 of the auxiliary steering cylinder 34 and by the second draglink 38 being connected to a second end 37 of the through piston rod 36 of the auxiliary steering cylinder 34. The draglinks 32, 38 are arranged for articulation relative to the through piston rod 36 via ball joints, 40, 42. The auxiliary steering cylinder 34 with through piston rod 36 is rigidly fastened to the frame 8 of the vehicle 2 by a bracket 64. The auxiliary steering cylinder 34 with the through piston rod 36 delivers sufficient force for steering of the wheels on the second steerable front axle 6, since the steering gear 10 has only enough force to steer the wheels on the first steerable front axle 4. A steering linkage 31 comprising the first draglink 32, the auxiliary steering cylinder 34 with the through piston rod 36, and the second draglink 38 thus makes it possible to steer a steerable front axle 6 where the force of the steering gear 10 is not sufficient. The steering gear 10 is arranged in such a way that when the steering wheel 30 of the vehicle 2 is turned in one direction, e.g. to the left, the guide arm 12 moves forward, and when the steering wheel 30 is turned in the other direction the guide arm 12 moves rearward. The guide arm 12, the draglinks 32, 38 and the through piston rod 36 are rigid. The front axles 4, 6 of the vehicle 2 are suspended in the frame 8 of the vehicle 2 by a spring package (not depicted). Compared with the known embodiment described above, the known version previously described above of the auxiliary steering cylinder and intermediate drop arm and its frame bearing and frame bracket are replaced by the auxiliary steering cylinder 34 according to the invention and its frame bracket, thereby reducing the number of ball joints while at the same time obviating the need to lubricate the previously known frame bearing of the intermediate drop arm.

FIG. 3 depicts schematically a vehicle 2 with steerable wheels 44, 46, 48, 50 on two front axles 4, 6 according to the invention. The vehicle 2 comprises a vehicle frame 8, a steering gear 10 mounted on the vehicle frame, a guide arm 12 connected pivotably to the steering gear 10, and a main draglink 14 arranged for articulation relative to the guide arm 12 and adapted to steering the steerable wheels 44, 46 arranged on the steerable first front axle 4 of the vehicle via a draglink arm 52 and track rod 56. A first draglink 32 is arranged for articulation relative to the guide arm 12 for steering of the steerable wheels 48, 50 arranged on the second steerable front axle 6 of the vehicle 2. This first draglink 32 is connected via an auxiliary steering cylinder 34 with through piston rod 36 to a second draglink 38 which is adapted to steering the steerable wheels 48, 50 arranged on the second steerable front axle 6 of the vehicle via a draglink arm 58 and track rod 62 by the first draglink 32 being connected to a first end 35 of the through piston rod 36 of the auxiliary steering cylinder 34 and by the second draglink 38 being connected to a second end 37 of the through piston rod 36 of the auxiliary steering cylinder 34. The draglinks 32, 38 are arranged for articulation relative to the through piston rod 36 via ball joints 40, 42. The auxiliary steering cylinder 34 with through piston rod 36 is preferably rigidly or, alternatively, articulatedly fastened to the frame 8 of the vehicle 2 by a bracket 64. The auxiliary steering cylinder 34 with the through piston rod 36 is dimensioned to deliver sufficient force for steering of the wheels 48, 50 on the second steerable front axle 6, since the steering gear 10 has only enough force to steer the wheels 44, 46 on the first steerable front axle 4. The steering gear 10 is arranged in such a way that when the steering wheel (not depicted) of the vehicle 2 is turned in one direction, e.g. to the left, the guide arm 12 moves forward, and when the steering wheel is turned in the other direction the guide arm 12 moves rearward. The guide arm 12, the draglinks 32, 38 and the through piston rod 36 are rigid. The front axles 4, 6 of the vehicle 2 are suspended in the frame 8 of the vehicle 2 by a spring package (not depicted). As indicated above, the steering linkage 31 thus comprises a first draglink 32, an auxiliary steering cylinder 34 and a second draglink 38, which auxiliary steering cylinder 34 comprises a through piston rod 36. The first draglink 32 being arranged between a guide arm 12 of a steering gear 10 and a first end 35 of the through piston rod 36 and the second draglink 38 being arranged between steerable vehicle wheels 48, 50 and the second end 37 of the through piston rod 36 make it possible for the steerable vehicle wheels 48, 50 to be steered via the steering gear 10. Depending on which side of the vehicle 2 the steering gear 10 is situated on, a further linkage (not depicted), e.g. a track rod or intermediate drop arms with two or more draglinks, may be arranged between the guide arm 12 of the steering gear 10 and the first draglink 32 for transmission of a motion of the guide arm 12 to the steerable wheels 48, 50.

The main draglink 14 and the draglink 38 are articulatedly fastened to respective draglink arms 52, 58, e.g. by ball joints, to absorb the springing movement of the respective axles 4, 6.

The invention is here described in connection with a vehicle with two front axles with steerable wheels. It is also possible to use the invention on vehicles with a steerable forward axle and a steerable rear axle or for vehicles with three or more axles with steerable wheels. Irrespective of the number of axles with steerable wheels, at least of one of those axles, preferably the second from the front, is equipped with a steering linkage according to the invention.

The invention claimed is:

1. A steering linkage for a vehicle comprising:
    steerable wheels of the vehicle;
    a steering gear;
    a guide arm pivotably connected to the steering gear;
    a main draglink connecting the steering gear to first steerable wheels and configured and operable for steering the first steerable wheels, the main draglink being directly connected to the guide arm;
    a first steerable front axle of the vehicle on which the first steerable wheels are arranged;
    a second steerable front axle;
    an auxiliary steering cylinder comprising a through piston rod;
    a first draglink arranged between the steering gear and a first end of the through piston rod, the first draglink being directly connected to the through piston rod; and
    a second draglink arranged between second steerable wheels arranged on the second steerable front axle of the vehicle and a second end of the through piston rod, so that the second steerable vehicle wheels arranged on the second steerable front axle of the vehicle are steered via the steering gear.

2. A steering linkage according to claim 1, wherein the first draglink is articulated relative to the guide arm.

3. A steering linkage according to claim 1, further comprising a draglink arm between the second draglink and the second steerable wheels so that the second draglink steers the second steerable wheels; and a track rod between the second steerable wheels for steering them together.

4. A steering linkage according to claim 3, wherein the second draglink is fastened articulatedly to the draglink arm.

5. A steering linkage according to claim 1, wherein the first draglink and the second draglink are articulated relative to the through piston rod via respective ball joints.

6. A steering linkage according to claim 1, further comprising a bracket fastening the auxiliary steering cylinder to a frame of the vehicle.

* * * * *